(12) United States Patent
Briggs

(10) Patent No.: US 9,060,630 B2
(45) Date of Patent: Jun. 23, 2015

(54) MULTI-PURPOSE SERVICE NAPKIN

(76) Inventor: Nathan Briggs, St. Helena, CA (US)

( * ) Notice: Subject to any disclaimer, the term of this patent is extended or adjusted under 35 U.S.C. 154(b) by 271 days.

(21) Appl. No.: 13/506,476

(22) Filed: Apr. 23, 2012

(65) Prior Publication Data

US 2013/0280450 A1 Oct. 24, 2013

(51) Int. Cl.
| | | |
|---|---|---|
| *B29D 22/00* | (2006.01) | |
| *B29D 23/00* | (2006.01) | |
| *B32B 1/08* | (2006.01) | |
| *B32B 27/32* | (2006.01) | |
| *A47G 23/00* | (2006.01) | |
| *A47J 45/10* | (2006.01) | |

(52) U.S. Cl.
CPC ........... *A47G 23/00* (2013.01); *Y10T 428/1334* (2015.01); *A47J 45/10* (2013.01)

(58) Field of Classification Search
CPC ..... A47G 11/001; A47G 11/00; A47G 23/00; A47J 45/10; Y10T 428/1334
USPC ......................................... 428/35.2
See application file for complete search history.

(56) References Cited

U.S. PATENT DOCUMENTS 5,260,536 A * 11/1993 Peery ............................ 219/730

* cited by examiner

*Primary Examiner* — Michael C Miggins
(74) *Attorney, Agent, or Firm* — Gerald L. Robertson

(57) ABSTRACT

A napkin having a pliable silicone insert, said napkin being sized to fit in one's hand. The napkin being fashioned with at least one absorbent side and optionally a non-absorbent or non-skid side. The napkin further may be embroidered with a friction point formed with silicone or rubberized thread. Optionally, a pair of windows may be provided on one side of said napkin to expose the silicone insert allowing a grip function for said napkin.

11 Claims, 4 Drawing Sheets

MULTI-PURPOSE SERVICE NAPKIN

FIELD OF THE INVENTION

The invention pertains to the field of restaurant service equipment. More particularly, the invention pertains to a device created to assist wait staff with a variety of serving functions from carrying hot platters to pouring wine without spilling.

REFERENCE TO RELATED APPLICATIONS

This application is an original first filing; no provisional, continuation or other document, has been filed with the United States Patent & Trademark Office by Applicant pertaining to this subject matter.

ACKNOWLEDGMENT OF GOVERNMENT SUPPORT

This invention was not developed with any type of government support. The government has no rights in applicant's invention.

BACKGROUND OF THE INVENTION

In the field of restaurant service, waitstaff are called upon to perform a multitude of functions. Among these duties are the carrying of platters of food, often quite hot and requiring extra care for safety of the waitperson and restaurant patrons. Additionally, in fine dining establishments, waitstaff are also called upon to open and pour wine where spilling wine can have several negative consequences. Other duties may require waitstaff to regularly use napkins solely or in combination with other means to effectively perform their duties.

Perhaps one of the most common uses of the napkin by waitstaff is their use of a napkin in conjunction with carrying and serving hot plates. Traditional napkins only provide limited utility in this application for a variety of reasons: the napkins typically may have a slippery surface; depending on the thickness of the napkin, only a limited barrier to potentially extreme heat is provided to the server; and the traditional napkin is generally of a size which can become awkward if the napkin unfolds during use, making the transport of a hot platter somewhat awkward.

Some traditional napkins, depending if they are of a combination of polyester and cotton, and particularly in view of how they may be laundered, can have a quite slick surface making the balancing of a hot platter difficult. If the napkin in such an instance is folded in order to prevent an insulating barrier to the plate, it can have a tendency to slide in the folds, further making its use precarious.

What is needed is a napkin which provides an effective heat barrier in comparison to common place table or service napkins.

In the haste to expedite food to table, waitstaff often resort to grabbing the handiest napkin proximately available in order to begin serving plates to the table. Unfortunately, a variety of sizes of napkins may be available, thereby necessitating the folding of the napkin, making its use awkward.

What is needed then is a functional napkin readily available to the server, so that precious time in not lost in the often times hectic expediting of food.

Servers also are often called upon to present and serve fine wines and other beverages. In the traditional initial presentation of a bottle of wine, the wine is shown to the table, held at the bottom and at the neck, with the bottle angled slightly forward at the bottom so that the patron my read the label, confirming that the bottle ordered is the brand and vintage selected. Next, the server proceeds to cut the capsule, and remove the cork, after which a small pour for tasting is served. At this point, the propensity to spill a bit of the wine is the greatest because the wine bottle is full, and it will begin to pour with the least amount of tipping of the bottle. At this juncture, the server runs the risk of spilling wine on the tablecloth or worse, on a plate or even the patron. Servers commonly use a napkin underneath the bottle to prevent such a happenstance. Furthermore, drips form at the lip of the neck of the bottle, requiring them to be wiped off lest the drip fall, again risking staining table linen or worse, the clothing of a patron.

Unfortunately, most restaurant napkins are white, and the spill which is more or less presented results in a stain on the napkin or the table linen. It is commonly accepted that wine stains can be among the most stubborn to remove. Therefore, the number of wine-stained napkins generated during a shift in a fine dining restaurant represents a significant cost is terms of the number of napkins to be available on hand as well as laundering costs.

What is needed is a napkin which resists or hides stains and reduces the cost to the restaurant in terms of laundry and supply.

Another function in which napkins are employed in table service is in bringing silverware or flatware to the table. As previously stated, the table napkin is often used for this activity. Unfortunately, the common table napkin is usually too big to be carried in a pocket or in the apron pocket as the bulge is unsightly and the napkin size unwieldy for the mere presentation of utensils.

What is needed is a napkin which is functionally of optimum size to allow its use in a variety of activities, while at the same time, easily carried and less noticeable if even concealed.

During the course of a meal, servers in establishments where table linen is used, find it necessary to "crumb" the table with the use of a simple apparatus of a length of curved metal, used to scrape the crumbs from the cloth in order to keep the table free of debris and having a sustained look of elegance. The dilemma facing the waiter is what to do with the crumbs being raked from the table. To simply deposit them into the servers hand at the edge of the table is less than appealing not to mention contributing to the issue of sanitation. The common table napkin again is larger than needed for this application.

Yet another function of the server is to bring sauce or other accompaniments to the table for service with or on the course. When pouring sauce it is necessary to have a napkin positioned to catch any potential drips and wipe the spout of the serving dish for the sauce.

What is needed is a napkin whose size lends itself to the functions of the crumbing of a table and the serving of sauces.

Often times, dining out is associated with a celebration or other occasion which calls for the serving of chilled wines, notably champagne. In such cases, a napkin is used to wipe condensation from the bottle prior to serving, making it easier for the server to handle the bottle. The constant use of common table napkins for these types of applications again adds to the expense of supplying the napkins as well as laundering them. Further, these napkins, due to the laundering process, often have limited absorption properties for such a function.

What is needed is a multipurpose napkin, which is sized sufficient to be used to handle a variety of functions, and having sufficient absorption characteristics to effectively remove condensation from cold beverages.

Suffice it to say that a number of functions for table service are typically accomplished with the use of a common table napkin. While the choice of a table napkin is natural and easy, the size and properties of the napkin are generally only of mediocre effectiveness. What is needed is a multipurpose serving napkin, which is suited to handle the activities with effectiveness greater than a simple piece of standard size cloth.

SUMMARY OF THE INVENTION

Applicant's invention provides a versatile multipurpose device, which assists in a variety of service functions with far greater application than the typical dinner or serving napkin, with a focus on size, utility, safety, performance and image.

The best mode of applicant's invention comprises a sleeve of specific material housing a pliable insert of heat resistant material, typically comprised of silicone. The "napkin" is sized just smaller than the length of a hand and about the same width. The minimum dimensions are essentially dictated by the need to protect the server's hand from contact with a hot platter. The silicone insert provides an insulating barrier against the heat from dishes or platters being served. The best mode of the invention comprises fabric of a dark color such as navy blue or black. Other dark colors consistent with the theme of the restaurant may be employed, the primary reason for the dark color is to hide stains from wine or other sources, however, any color may be used at the discretion of the establishment or waiter.

Being so sized, the napkin can be easily carried in a pant or apron pocket thereby readily accessible to the server and not producing an unsightly bulge, preserving the server's appearance and not getting in the server's way.

The fabric of the preferred embodiment further has absorbent properties allowing the absorption of wine when serving or the elimination of condensation from chilled bottles.

In another embodiment of applicant's invention, one side of the napkin is comprised of absorbent material and the opposing side of non-absorbent material, thereby allowing the use of the napkin for crumbing, disallowing the contact of absorbed wine with crumbs and the associated sanitation challenges arising from those combined uses, while still allow the sanitary transport of utensils to the table.

In yet another embodiment of applicant's invention, the non-absorbent side of the napkin may be comprised of a material having a more adherent property, providing a somewhat non-skid feature allowing a more effective and safer attribute to the napkin for carrying hot platters or plates of food. This is also useful for the carrying of a single beverage, hot or cold.

In embodiments wherein the non-absorbent side of the napkin does not provide a more adherent property, the use of embroidery on either side of the napkin with a rubberized or silicone type thread can provide a friction point for use in contacting the underside of plates and platters, thereby providing the non-skid aspect some servers may desire.

In yet another embodiment of applicant's invention, two windows are provided in the non-absorbent side of the napkin approximately equidistant from the center of the longer of the two dimensions of the napkin, these windows exposing the silicone insert. These windows are placed apart from each other the distance equivalent to the diameter of the bottom of a champagne bottle. Having this feature provided, the server may place the napkin such that the silicone exposed in the windows contact the perimeter of the bottom of the bottle, allowing the server after having first wiped off the condensation to twist the bottom of the bottle to aid in removing a stubborn champagne cork. These windows may also provide the non-skid feature for securely carrying platters and plates.

In yet another embodiment of applicant's invention, the sleeve is left open at the top such that the silicone insert may be removed for effective laundering of the napkin sleeve, the silicone piece then being reinserted after laundering for full-featured use.

DETAILED DESCRIPTION OF THE INVENTION

Figure 1:
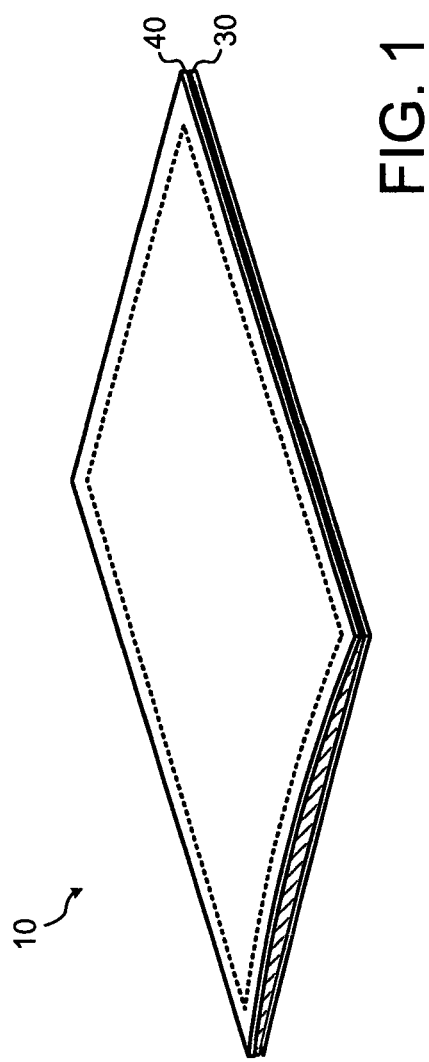
FIG. 1 is an isometric view of applicant's invention.
Figure 2:
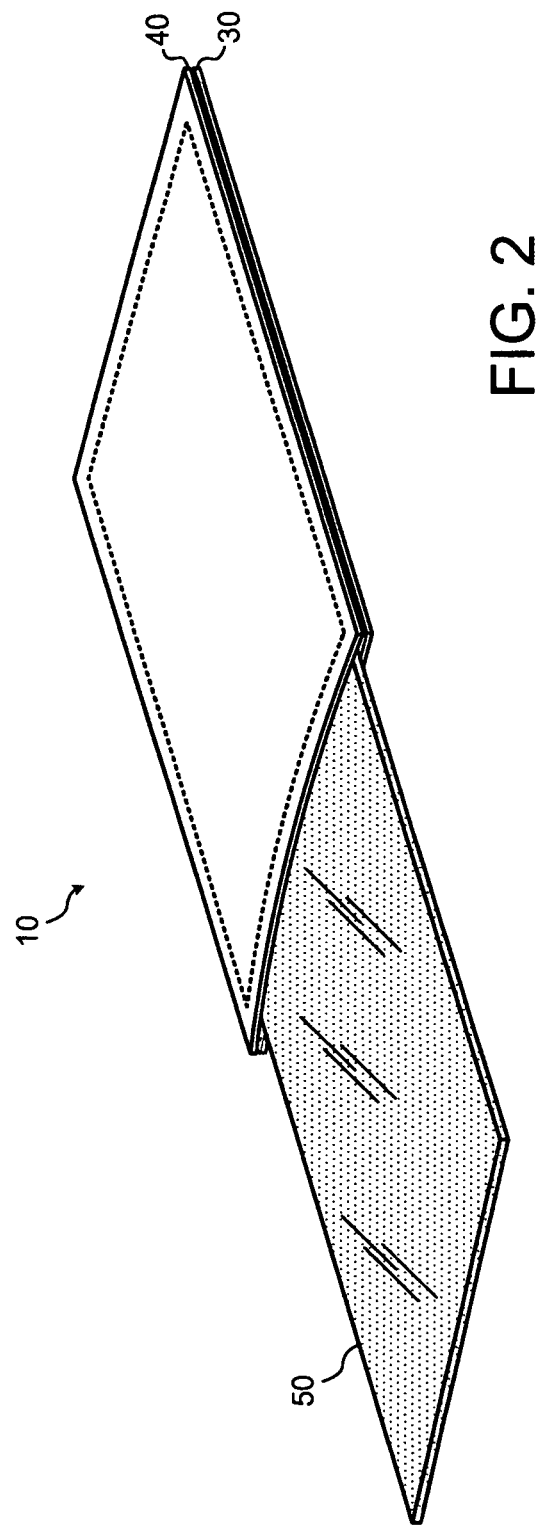
FIG. 2 is an isometric view of the invention in FIG. 1, showing the silicone piece being inserted into said sleeve.

As shown in FIG. 1, napkin 10 comprises a substantially rectangular sleeve 20 formed by two substantially identically sized pieces of material 30 and 40, sewn together to receive a piece of silicone of uniform thickness 50, said piece of silicone 50 being of similar, yet slightly smaller, size than said pieces of material 30 and 40 such enabling said piece of silicone 50 to be firmly retained in said sleeve.

Material piece 30 comprises a piece of absorbent material such as cotton or a blend thereof with another suitable material or fabric, preserving the absorbent nature thereof. Said piece 20 being approximately the thickness of a standard napkin.

Material piece 40 may comprise a non-absorbent fabric or other material.

Silicone piece 50 comprises an extremely flexible, substantially rectangular silicone material of a typical thickness of approximately 2 millimeters. Thicker pieces may also be employed to provide protection from extremely hot platters and plates.

Figure 3:
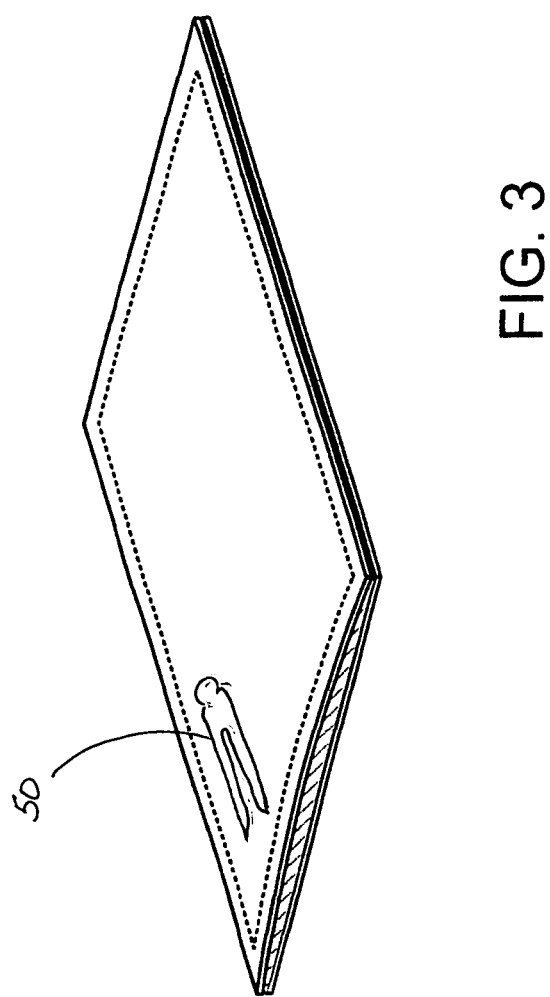
FIG. 3 is an isometric view of a second embodiment of applicant's invention showing the embroidered friction point.

The embodiment shown in FIG. 3 shows a simple embroidered element 50, sewn into either side of sleeve 20.

Figure 4:
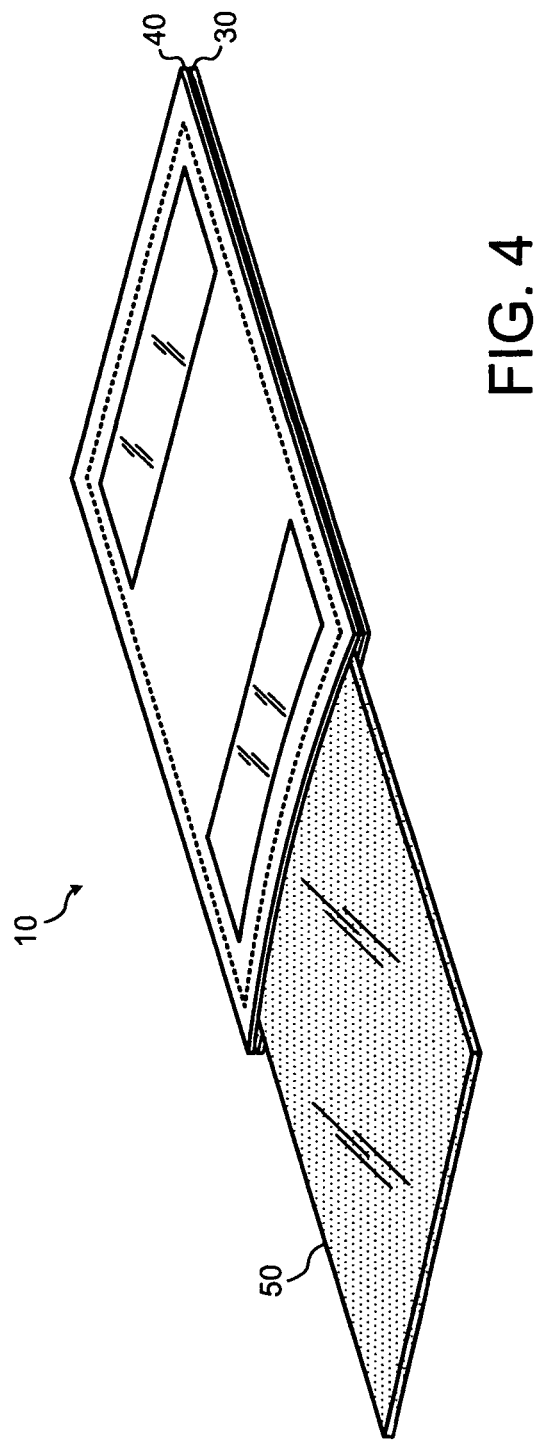
FIG. 4 is an isometric view of a third embodiment of applicant's invention showing the windows on one side.

FIG. 4 illustrates another embodiment of applicant's invention highlighting a plurality of windows, in this embodiment, a pair of windows 60 and 60', said windows exposing thereunder said silicone piece 50, said windows being substantially equidistant from the center of the length of sleeve 20 and approximately 3" apart, approximately the diameter of the bottom of a champagne bottle.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A service napkin comprising:
    a first piece of material and a second piece of material of substantially equivalent size, said first and second piece of material affixed to one another forming a sleeve; and
    an insert of heat resistant material of substantially uniform thickness, said insert sized substantially smaller than said sleeve such that said insert may be housed firmly therein.
2. The napkin of claim 1 wherein:
    said insert comprises pliable, heat resistant silicone.

3. The napkin of claim 1 wherein:
said sleeve being enclosed after insertion of said silicone piece.

4. The napkin of claim 1 wherein:
at least one piece of material comprising an absorbent fabric material.

5. The napkin of claim 1 further comprising:
a friction point formed by the embroidering of silicone or rubberized thread upon either first piece of material or said second piece of material.

6. The napkin of claim 1 wherein:
said second piece of material comprising a substantially non-absorbent material.

7. The napkin of claim 6 wherein:
said second piece of material having an adherent or non-skid property.

8. The napkin of claim 1 further comprising:
a pair of windows provided in either of said first or said second piece of material, said windows exposing said silicone piece thereunder, said windows substantially equidistant from the center of said sleeve, said windows positioned apart a distance approximately the diameter of the bottom of a bottle of champagne.

9. The napkin of claim 8 wherein
a pair of windows provided in either of said first or said second piece of material, said windows exposing said silicone insert thereunder, said windows substantially equidistant from the center of said sleeve, said windows positioned apart a distance approximately the diameter of the bottom of a bottle of champagne.

10. A napkin comprising:
a first piece of material and a second piece of material of substantially equivalent size, said first and second piece of material affixed to one another forming a sleeve; and
an insert of heat resistant material of substantially uniform thickness, said insert sized substantially smaller than said sleeve such that said insert may be housed firmly therein;
said sleeve being enclosed after insertion of said silicone piece;
said first piece of material comprising an absorbent material;
said second piece of material comprising a substantially non-absorbent material;
said second piece of material having an adherent or non-skid property; and
a friction point formed by the embroidering of silicone or rubberized thread upon either first piece of material or said second piece of material.

11. A napkin comprising:
a first piece of material and a second piece of material of substantially equivalent size, said first and second piece of material affixed to one another forming a sleeve; and
an insert of heat resistant material of substantially uniform thickness, said insert sized substantially smaller than said sleeve such that said insert may be housed firmly therein, said insert comprising pliable heat resistant silicone;
said first piece of material comprising an absorbent material;
said second piece of material comprising a substantially non-absorbent material;
at least one window provided in either of said first or said second piece of material, said window exposing said silicone insert thereunder.

* * * * *